(12) United States Patent
Shirai et al.

(10) Patent No.: US 7,600,918 B2
(45) Date of Patent: Oct. 13, 2009

(54) LINEAR GUIDANCE DEVICE

(75) Inventors: Takeki Shirai, Tokyo (JP); Shigeru Ebina, Tokyo (JP); Shinji Izumi, Tokyo (JP); Yuki Hayashi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 12/306,456

(22) PCT Filed: Sep. 26, 2007

(86) PCT No.: PCT/JP2007/068704

§ 371 (c)(1),
(2), (4) Date: Dec. 23, 2008

(87) PCT Pub. No.: WO2008/038674

PCT Pub. Date: Apr. 3, 2008

(65) Prior Publication Data

US 2009/0185765 A1    Jul. 23, 2009

(30) Foreign Application Priority Data

Sep. 29, 2006 (JP) ............................. 2006-266370
Mar. 27, 2007 (JP) ............................. 2007-081906

(51) Int. Cl.
*F16C 29/06* (2006.01)

(52) U.S. Cl. ...................................................... 384/45

(58) Field of Classification Search .............. 384/43–45
See application file for complete search history.

(56) References Cited

U.S. PATENT DOCUMENTS 3,552,806 A * 1/1971 Weasler et al. ................. 384/45

(Continued)

FOREIGN PATENT DOCUMENTS

JP    56-120817 A    9/1981

(Continued)

OTHER PUBLICATIONS

International Search Report of PCT/JP2007/068704, Mailing Date of Oct. 30, 2007.

*Primary Examiner*—Thomas R Hannon
(74) *Attorney, Agent, or Firm*—Westerman, Hattori, Daniels & Adrian, LLP.

(57)    ABSTRACT

Provided is a linear guidance device in which a track groove (30, 70) serving as an endless circulation path for balls (3) can be formed through cutting or grinding with high precision and with ease at low cost. The linear guidance device includes: a raceway rail (1, 5) provided with a ball rolling groove (10, 50) which is formed on each side surface thereof; and a movement block (2, 6) formed in a channel configuration in which a base portion (20, 60) and a pair of flange portions (21, 61) are provided so that a guide groove (22, 62) is formed, and including the track groove which are provided with the guide groove faced with the raceway rail (1, 5), in which the track groove includes: a load straight-line groove (31, 71) formed in an inner surface of the flange portions; a non-load straight-line groove (32, 72) formed in a concave corner portion of the guide groove which is bordered with the flange portions and the base portion or formed in the base portion so as to be faced with the raceway rail; a ball deflection groove (33, 73) which communicatively couples the load straight-line groove and the non-load straight-line groove to each other so as to allow the balls to move therebetween.

5 Claims, 5 Drawing Sheets

U.S. PATENT DOCUMENTS

| | | | |
|---|---|---|---|
| 3,951,471 A * | 4/1976 | Langenstein | 384/45 |
| 4,030,191 A * | 6/1977 | Ernst et al. | 384/45 |
| 4,375,305 A | 3/1983 | Teramachi | |
| 4,652,147 A | 3/1987 | Geka | |
| 4,797,012 A | 1/1989 | Tanaka | |
| 4,921,361 A * | 5/1990 | Steeves | 384/45 |
| 5,429,439 A | 7/1995 | Hsu et al. | |
| 7,303,335 B2 * | 12/2007 | Kato et al. | 384/45 |
| 2003/0123761 A1 | 7/2003 | Kawashima et al. | |
| 2004/0232299 A1 | 11/2004 | Kato et al. | |
| 2008/0112656 A1 | 5/2008 | Shirai et al. | |

FOREIGN PATENT DOCUMENTS

| | | |
|---|---|---|
| JP | 62-4922 A | 1/1987 |
| JP | 01-126422 A | 5/1989 |
| JP | 4-56215 U | 5/1992 |
| JP | 06-173947 A | 6/1994 |
| JP | 9-291937 A | 11/1997 |
| JP | 2003-74552 A | 3/2003 |
| JP | 2003-194056 A | 7/2003 |
| WO | 2006/022242 A1 | 3/2006 |
| WO | 2006/064734 A1 | 6/2006 |

* cited by examiner

LINEAR GUIDANCE DEVICE

TECHNICAL FIELD

The present invention relates to a linear guidance device in which a movement block is assembled to a raceway rail through an intermediation of a large number of balls which make an endless circulation so that a mounted object which is fixed to the movement block is allowed to freely reciprocate along the raceway rail. More particularly, the present invention relates to a linear guidance device of a simple structure in which an endless circulation path for balls is formed as a track groove which is faced with a raceway rail with respect to the movement block.

BACKGROUND ART

In a linear guidance portion of a work table of a machine tool or of various conveying devices, there is widely used a rolling guidance device in which a movement block with a movable body such as a table mounted thereon moves continuously along a raceway rail. In a rolling guidance device of this type, the movement block is assembled to the raceway rail through the intermediation of a large number of balls, and the balls roll while bearing a load between the movement block and the raceway rail, whereby it is possible for the movable member mounted to the movement block to make a smooth movement along the raceway rail while involving little resistance. Further, the movement block is provided with an endless circulation path for the balls, and the balls are allowed to circulate in this endless circulation path, whereby it is possible for the movement block to move continuously along the raceway rail.

Conventional examples of the mainly used movement blocks include a block main body made of metal and an end cap made of synthetic resin, which is coupled to each of both ends of the block main body. In the block main body, there is formed a load rolling groove in which the balls roll while bearing a load between the block main body and a ball rolling groove of a raceway rail, and is provided with a non-load ball path grooved in parallel with the load rolling groove. In order to suppress the temporal friction with respect to rolling of the balls, the block main body is made of steel capable of being quenched, for example. Further, the end cap is provided with a direction changing path which is formed through injection molding of a synthetic resin so as to achieve a complicated configuration. In this context, a pair of end caps are accurately fixed with respect to both the front and rear end surfaces of the block main body, whereby the end of the load rolling path and the end of the non-load ball path are coupled through an intermediation of the direction changing path. In this way, the movement block provided with the endless circulation path for the balls is completed.

However, there is a problem in that the conventional movement block as described above requires much time and effort in working and assembly thereof, which leads to an increase in manufacturing cost thereof.

Meanwhile, WO2006-022242 A1 discloses a linear guidance device in which a structure of the movement block is dramatically simplified. In the linear guidance device, the endless circulation path for the balls is formed as a track groove with respect to the movement block made of metal, the movement block being formed of a single metal piece. The track groove includes the load straight-line groove in which the balls roll while bearing a load between the load straight-line groove and the ball rolling groove of the raceway rail, the pair of ball deflection grooves which are provided at both the ends of the load straight-line groove so as to change the rolling direction of the balls having rolled in the load straight-line groove such that the balls are allowed to leave the ball rolling groove of the raceway rail, and the non-load straight-line groove for transferring the balls in a non-load state from one ball deflection groove to the other ball deflection groove. The track groove is formed at the position of being faced with the raceway rail of the movement block, whereby the balls rolling in a non-load state in the ball deflection groove and the non-load straight-line groove are prevented from leaving the track groove.

Further, WO 2006-064734 A1 discloses a similar linear guidance device. In the linear guidance device, the track groove is formed in the ball circulation plate which is provided separately from the movement block. The ball circulation plate is engaged with the movement block, whereby the track groove can be positioned while being faced with the raceway rail.

The track groove can be formed continuously with the movement block or the ball circulation plate through cutting with use of an end mill. This configuration contributes to reduction in manufacturing cost when compared with that of the conventional linear guidance device which requires the end caps.

Patent Document 1: WO 2006-022242 A1
Patent Document 2: WO 2006-064734 A1

DISCLOSURE OF THE INVENTION

Problem to be Solved by the Invention

However, in the linear guidance device disclosed in WO 2006-022242 A1, when the raceway rail is formed in a substantially rectangular sectional configuration and the movement block is formed in a channel configuration so as to straddle the raceway rail, the track groove is positioned on the inner surface of the channel groove of the movement block. In this case, when the end mill is inserted to the innermost of the channel groove for the purpose of performing cutting of the track groove, it is necessary to largely incline the end mill with respect to the inner surface of the channel groove. As a result, it is difficult to continuously form the entire of the track groove with high precision.

Further, in the linear guidance device disclosed in WO 2006-064734 A1, the track groove is formed in the ball circulation plate which is provided separately from the movement block, and hence there is no inconvenience in the formation itself of the track groove described above. However, there is a case in that it is necessary to perform an operation of engaging the completed ball circulation plate with the movement block, which leads to an increase in time and effort in assembling the movement block.

Means for Solving the Problems

The present invention has been made in view of the above-mentioned problems. An object of the present invention is to provide a linear guidance device in which a track groove serving as an endless circulation path for balls can be formed, through cutting or grinding with high precision and with ease at low cost, in a movement block which is formed in a channel configuration so as to straddle the raceway rail.

In order to achieve the above-mentioned object, a linear guidance device of the present invention includes:
a raceway rail which is formed in a substantially rectangular sectional configuration and provided with a ball rolling groove formed in a longitudinal direction on each side surface thereof; and a movement block which is formed in a channel configuration in which a base portion and a pair of flange portions protruding on the base portion are provided so that a guide groove is formed, and assembled with respect to the raceway rail loosely fitted to the guide groove through an intermediation of a large number of balls, and comprising multiple track grooves through which the balls circulate and which are provided with the guide groove faced with the raceway rail. Further, each of the track grooves includes:

a load straight-line groove which is formed in an inner surface of the flange portions while being faced with the ball rolling groove of the raceway rail;

a non-load straight-line groove which is provided in parallel with the load straight-line groove and formed in a concave corner portion of the guide groove, which is bordered with the flange portions and the base portion or formed in the base portion so as to be faced with the raceway rail;

a ball deflection groove which communicatively couples the load straight-line groove and the non-load straight-line groove to each other so as to allow the balls to move therebetween.

According to the linear guidance device of the present invention, the movement block is formed in a channel configuration in which the base portion and the pair of flange portions protruding on the base portion are provided so that the guide groove to which the raceway rail is loosely fitted is formed. Further, the movement block is assembled to the raceway rail through the intermediation of the large number of balls, and has the track groove in which the balls circulate, the track groove being formed inside the guide groove of the movement block. The load straight-line groove constituting apart of the track groove is faced with the ball rolling groove formed in the side surface of the raceway rail, the load straight-line groove being formed in each of the flange portions of the movement block. Meanwhile, the non-load straight-line groove constituting a part of the track groove and provided in parallel with the load straight-line groove is positioned at the concave corner portion of the guide groove, which is bordered with the flange portions and the base portion or at the base portion.

With this structure, when the track groove is subjected to cutting with use of an end mill, it is possible to reduce the insertion amount of the end mill with respect to the guide groove of the movement block when compared with that in the case where the entire of the track groove is formed in the flange portion, to thereby facilitate the approach of the end mill with respect to the portion in which the track groove is formed. That is, in the case of forming the non-load straight-line groove, the end mill is allowed to approach the base portion without a large inclination with respect thereto. Further, the flange portion is provided only with the load straight-line groove, and hence the protruding height of the flange portion with respect to the base portion can be set small. Even in the case of forming the load straight-line groove, the end mill is allowed to approach the flange portion without a large inclination with respect thereto. With this structure, it is possible to continuously form the entire of the track groove with high precision.

Further, the load straight-line groove can be formed in the inner surface of the flange portion while being positioned close to the concave corner portion of the guide groove of the movement block. Even when the force is applied to the movement block through the intermediation of the balls, with which the flange portion of the movement block is expanded, it is possible to minimize the deformation of the movement block. Further, it is necessary to form the non-load straight-line groove constituting the track groove to be deeper than the load straight-line groove. In this context, the non-load straight-line groove is formed at a certain portion in the region from the concave corner portion of the guide groove to the base portion. Thus, the flange portion can be formed to be thinner when compared with that in the case of forming the non-load straight-line groove in the flange portion. As a result, it is possible to minimize the width of the movement block. In addition, the protruding height of the flange portion with respect to the base portion can be set smaller in the movement block, whereby it is also possible to set small the height of the raceway rail which is straddled by the movement block.

That is, in the linear guidance device of the present invention, it is possible to secure the rigidity of the movement block and the raceway rail while minimizing the sectional areas of the movement block and the raceway rail in the direction orthogonal to the longitudinal direction of the raceway rail, and further to achieve the weight saving thereof. Accordingly, a linear reciprocating movement of high precision can be achieved.

As a matter of course, the track groove of the present invention is not necessarily formed through cutting with use of the end mill. For example, through metal injection molding, the track groove can be formed simultaneously with the formation of the movement block. However, in terms of stiffness of the movement block, abrasion resistance of the load straight-line groove, and ease of processing of the track groove, it is preferable that the movement block be made of steel product so as to be quenched, and the track groove be formed though cutting with use of the end mill after quenching.

The above-mentioned ease of processing can be achieved as long as the non-load straight-line groove is formed at any portion in the region from one concave corner portion to the other concave corner portion, which includes both the concave corner portions.

In particular, when the non-load straight-line groove is formed in the concave corner portion of the guide groove, it is possible to minimize the length of the ball deflection groove through which the balls are allowed to move between the load straight-line groove and the non-load straight-line groove. Therefore, in the case of cutting the track groove, the processing time therefor can be reduced. Further, when the non-load straight-line groove is formed in the concave corner portion of the guide groove, it is possible to reduce the thickness of the base portion when compared with that in the case of forming the non-load straight-line groove in the base portion, to thereby meet the demands for downsizing and weight saving of the movement block. In addition, when the non-load straight-line groove is formed in the concave corner portion of the guide groove, it is easy to secure the space for providing a tap hole into which a fixing screw is screwed with respect to the base portion upon fixation of the movement block to the movable body such as a table.

Further, as long as the ball deflection groove allows the balls to move between the load straight-line groove and the non-load straight-line groove, the specific configuration thereof may be appropriately changed.

Note that, when the non-load straight-line groove is formed in the base portion of the movement block so as to be faced with the upper surface of the raceway rail, the balls moves between the load straight-line groove and the non-load straight-line groove while surrounding the corner portion of the raceway rail, which is faced with the concave corner portion of the guide groove. Thus, in terms of smoothness of the balls moving therebetween, it is preferable that a trace of the ball deflection groove formed in vertical cross section in the longitudinal direction of the raceway rail be formed as a single arc around the corner portion of the raceway rail, which is faced with the concave corner portion of the guide groove of the movement block. That is, when the ball deflection groove is formed so as to have the trace described above, it is possible to stabilize the behavior of the balls in the ball deflection groove, to thereby allow the balls to smoothly move between the load straight-line groove and the non-load straight-line groove.

In this case, the balls move between the load straight-line groove and the non-load straight-line groove while surrounding the corner portion of the raceway rail, which is faced with the concave corner portion of the guide groove of the movement block. In this context, in order to smooth the rolling of the balls in the ball deflection groove, it is preferable that the corner portion of the raceway rail be formed in a curved configuration.

In addition, the depths the non-load straight-line groove and the ball deflection groove may be appropriately adjusted as long as the balls roll therein in a non-load state. However, in order to allow the balls to roll orderly without meandering in the grooves, it is preferable that the non-load straight-line groove and the ball deflection groove be formed so as to have a depth of more than half of the ball diameter. When the non-load straight-line groove and the ball deflection groove are formed so as to have the depth as described above, the balls roll in the non-load straight-line groove and the ball deflection groove while the equator thereof is recessed. As a result, it is possible to guide the balls rolling along a predetermined trace without causing the centers of the balls to meander.

BEST MODES FOR CARRYING OUT THE INVENTION

In the following, a linear guidance device of the present invention is described in detail with reference to the accompanying drawings.

Figure 1:
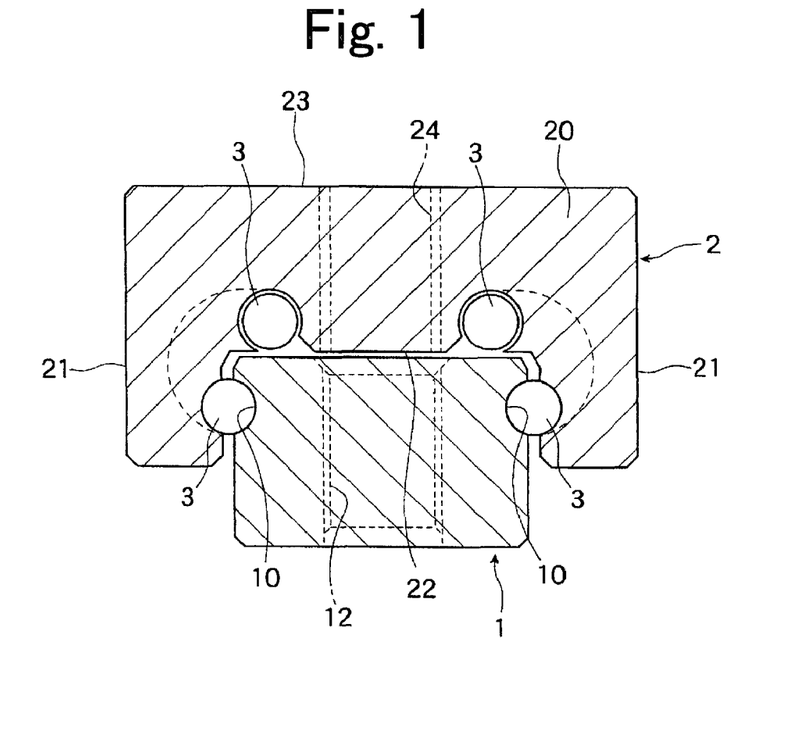
FIG. 1 is a front sectional view of a linear guidance device according to a first embodiment of the present invention.

FIG. 1 illustrates a linear guidance device according to a first embodiment of the present invention. The linear guidance device includes an elongated raceway rail 1 formed in a substantially rectangular sectional configuration, and a movement block 2 formed in a channel configuration and assembled to the raceway rail 1 through an intermediation of a large number of balls 3, the movement block 2 being allowed to freely reciprocate on the raceway rail 1 while straddling the raceway rail 1.

Figure 2:
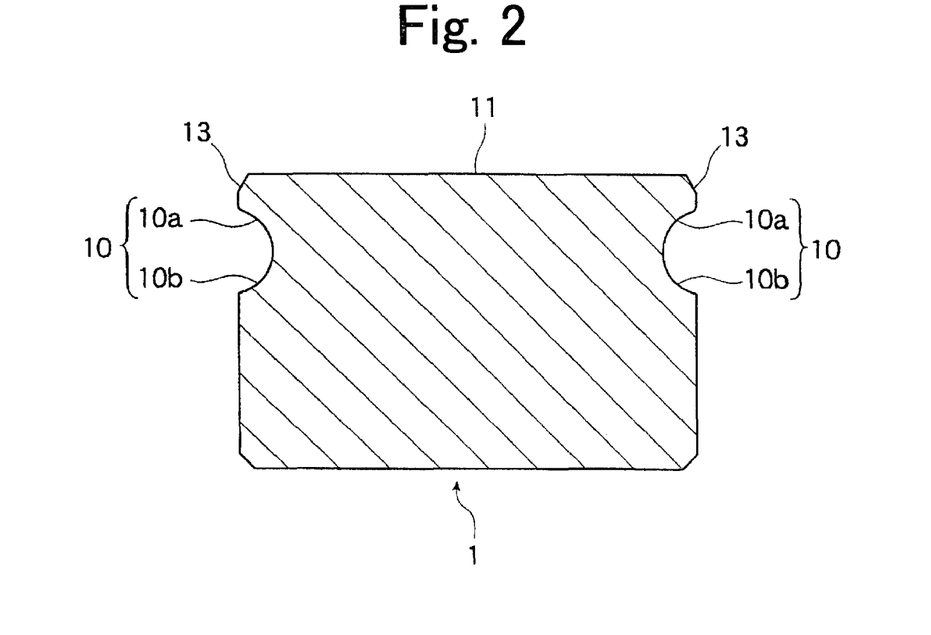
FIG. 2 is a front sectional view of a raceway rail of the linear guidance device illustrated in FIG. 1.

FIG. 2 illustrates a cross section orthogonal to the longitudinal direction of the raceway rail 1. The raceway rail 1 is provided with a rolling groove 10 for the balls 3, which is formed in the longitudinal direction on each side surface thereof. Each of those rolling grooves 10 is positioned while being slightly separated from the upper surface of the raceway rail 1, specifically, positioned while being separated from the upper surface 11 of the raceway rail 1 by the distance smaller than the radius of the balls 3. Each of the rolling grooves 10 has concave curves 10a and 10b, and is formed in a so-called Gothic arch sectional configuration. Accordingly, each of the balls 3 is held in contact with the concave curves 10a and 10b at two points. In the contact direction of each of the two points, an angle of 45° is formed with respect to the bottom surface of the raceway rail 1. Further, the raceway rail 1 is provided with multiple bolt receiving holes 12 which is formed at predetermined intervals in the longitudinal direction thereof while passing therethrough. With use of the bolt receiving holes 12, the raceway rail 1 can be attached to the fixation portion such as a bed and a column of various mechanical devices.

Further, an upper corner portion 13 which is bordered with the upper surface 11 and each of the side surfaces of the raceway rail 1 is formed in a curved configuration so as to be formed in a convex curve shape continuous from the concave curve 10a of each of the rolling grooves 10 to the upper surface 11. This is because, as described later, a smooth endless circulation of the balls 3 is achieved thereby in the movement block 2.

Figure 3:
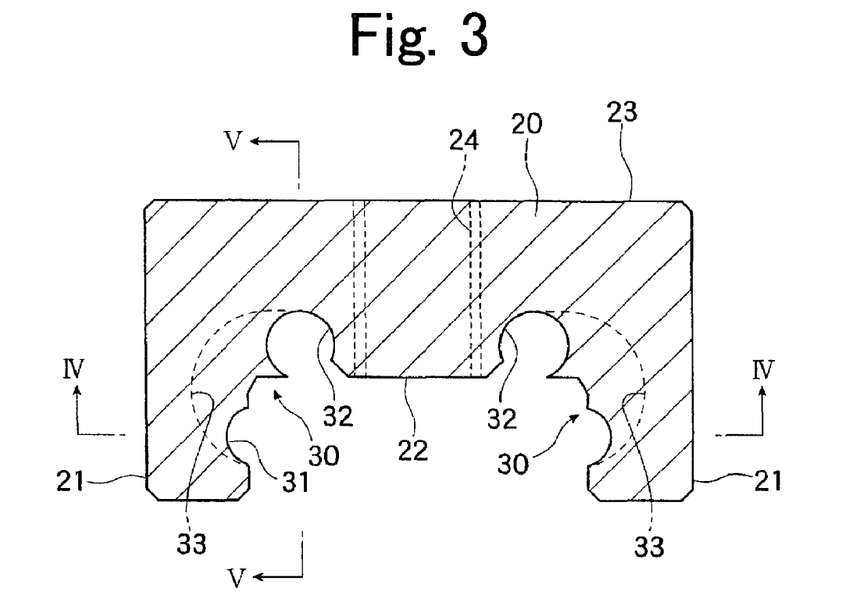
FIG. 3 is a front sectional view of a movement block of the linear guidance device illustrated in FIG. 1.

Meanwhile, as illustrated in FIG. 3, the movement block 2 includes a base portion 20 and a pair of flange portions 21 which is orthogonal to the base portion 20 so as to be formed in a channel configuration, and a guide groove 22 is provided between the pair of flange portions 21. Further, as illustrated in FIG. 1, the movement block 2 allows the top of the raceway rail 1 to loosely fit to the guide groove 22 such that the movement block 2 straddles the raceway rail 1 through an intermediation of a slight gap. That is, both the side surfaces of the raceway rail 1 and the inner surfaces of the flange portions 21 of the movement block 2 are faced with each other. Still further, the top surface of the base portion 20 serves as an attachment surface 23 for a movable body such as a table, and a tap hole 24 into which a fixing screw is engaged is formed in the base portion 20.

The movement block 2 includes track grooves 30 through which the balls 3 make an endless circulation. Each of the track grooves 30 includes a load straight-line groove 31 formed in the inner surface of each of the flange portions 21 while being faced with each of the rolling grooves 10 of the raceway rail 1, a non-load straight-line groove 32 formed in the base portion 20 while being faced with the upper surface 11 of the raceway rail 1 and in parallel with the load straight-line groove 31, and a ball deflection groove 33 for circulating the balls 3 between the load straight-line groove 31 and the non-load straight-line groove 32. The track grooves 30 are entirely opened to the raceway rail 1, and the balls 3 arranged in the track grooves 30 circulate in the track grooves 30 while being faced with the raceway rail 1.

Figure 4:
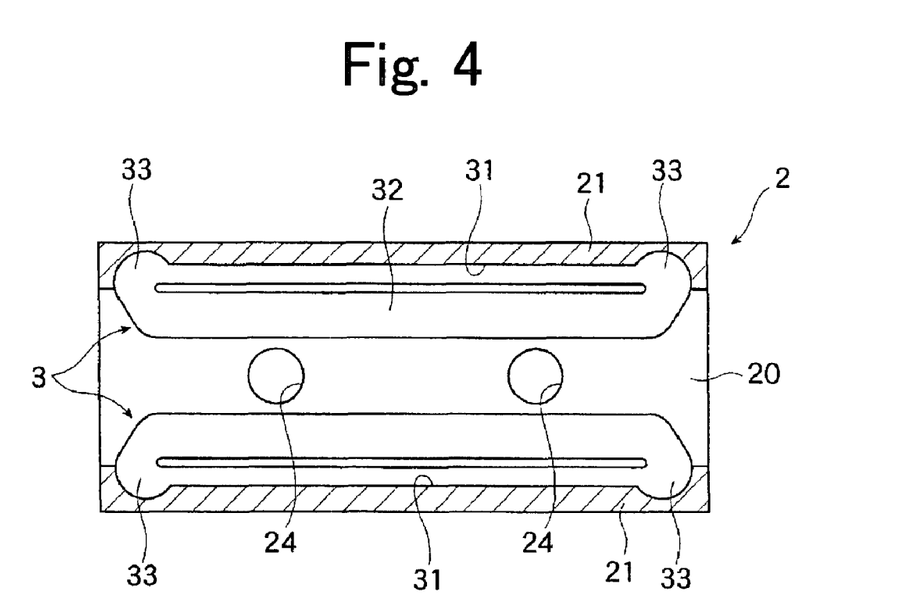
FIG. 4 is a sectional view taken along the line IV-IV of FIG. 3.
Figure 5:
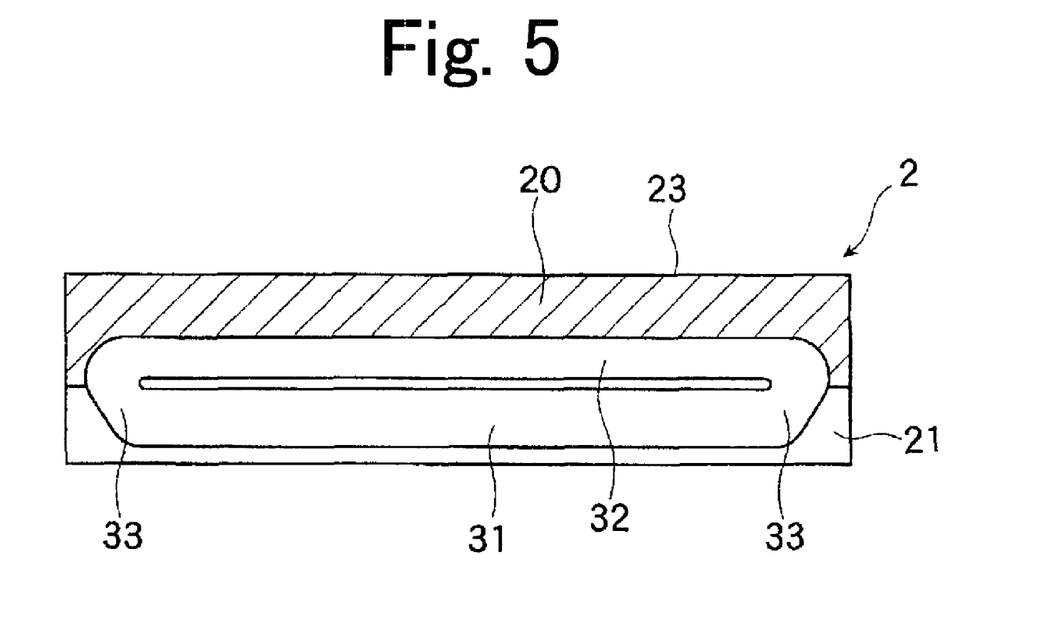
FIG. 5 is a sectional view taken along the line V-V of FIG. 3.
Figure 6:
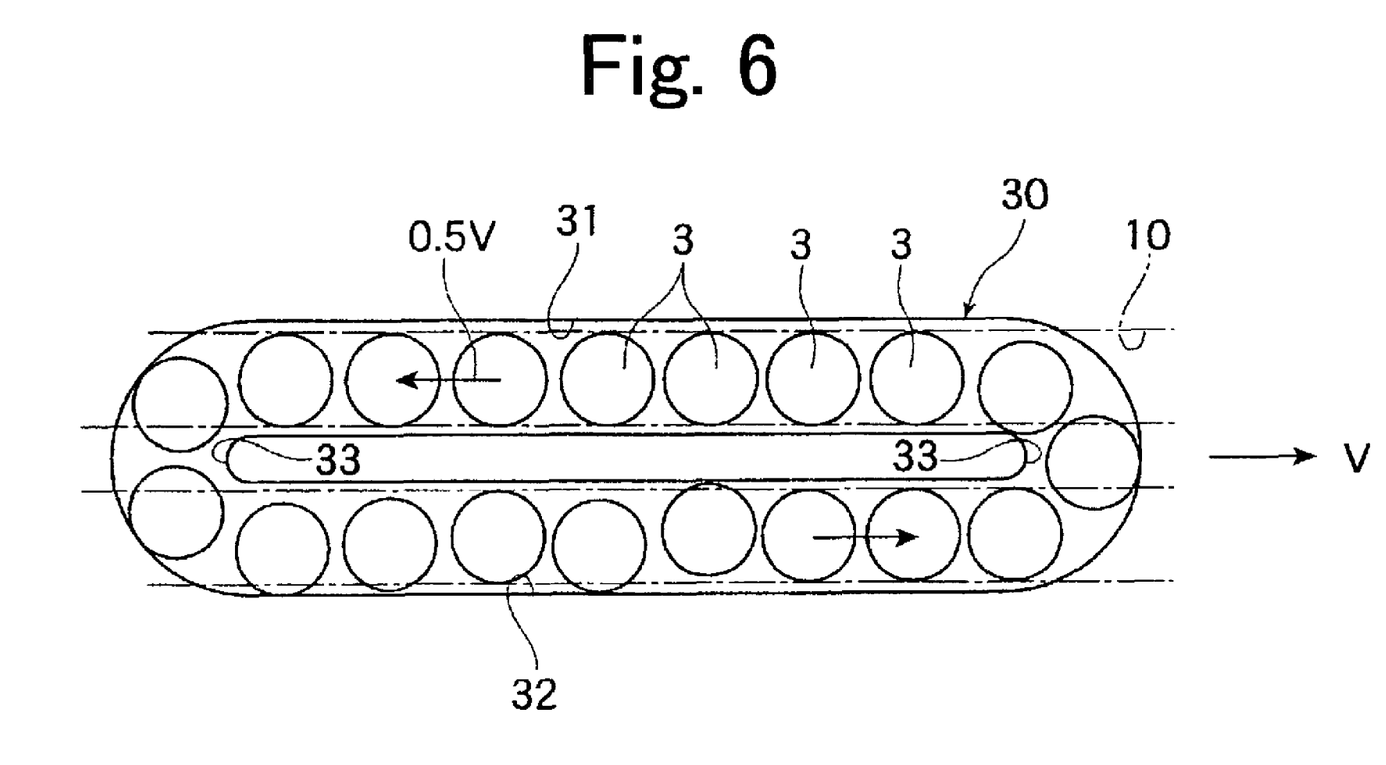
FIG. 6 illustrates a state in which the track groove of the movement block is developed in a plan view.

FIGS. 4 and 5 are sectional views taken along the lines IV-IV and V-V of the movement block illustrated in FIG. 3, respectively. The track grooves sandwich the concave corner portions of the guide groove 22 of the movement block so as to be formed across the base portion and the flange portions. Therefore, it is difficult to understand the entire configuration of the track grooves with reference to FIGS. 4 and 5. FIG. 6 illustrates a state in which the track groove is developed in a plan view.

The load straight-line groove 31 constituting a part of the track groove 30 is formed in a Gothic arch sectional configuration similarly to the rolling grooves 10 on the raceway rail 1 side. The balls 3 are held in contact with the load straight-line groove 31 at two points. Accordingly, the contact direction of the balls 3 and the load straight-line groove 31 is inclined by 45° in the vertical direction with respect to the direction of the normal line (lateral direction in the sheet of FIG. 3) on the inner surface of the flange portions 21. It is possible for the balls 3 to roll while bearing a load between the rolling groove 10 of the raceway rail 1 and the load straight-line groove 31 of the movement block 2, and possible for the movement block 2 to reciprocate along the raceway rail 1 while bearing loads applied in all the directions except the moving direction thereof.

Meanwhile, the non-load straight-line groove 32 constituting a part of the track groove 30 is formed as a path having a width slightly larger than the diameter of the balls 3, and the width of the opening to the upper surface 11 of the raceway rail 1 is set slightly narrower than the diameter of the balls 3. Accordingly, the balls 3 are accommodated in the non-load straight-line groove 32 in a non-load state, that is, in a state of being capable of freely rotated. Further, while the balls 3 enter the state of being retained in the non-load straight-line groove 32, the state is not intended for preventing the contact between the balls 3 and the raceway rail 1. The balls 3 roll in the non-load straight-line groove 32 while being brought into contact with the raceway rail 1.

Further, each of the ball deflection grooves 33 has a substantially U-shaped raceway which connects the load straight-line groove 31 and the non-load straight-line groove 32. The balls 3 having rolled through the load straight-line groove 31 while bearing a load are released from the load in the U-shaped raceway, gradually changed in the rolling direction thereof, and sent into the non-load straight-line groove 32 after direction change by 180 degrees. The ball deflection groove 33 is formed so as to be shallowest at the position of being coupled to the load straight-line groove 31 and deepest at the position of being coupled to the non-load straight-line groove 32. Owing to the gradual deepening of the ball deflection groove 33, when entering the ball deflection groove 33, the balls 3 having rolled through the load straight-line groove 31 are released from the load, and advance through the ball deflection groove 33 in a non-load state toward the non-load straight-line groove 32 prior to entering the non-load straight-line groove 32 as they are.

When the movement block 2 is moved along the raceway rail 1, the balls 3 held between the ball rolling groove 10 of the raceway rail 1 and the load straight-line groove 31 of the movement block 2 move in the load straight-line groove 31 at a speed of 0.5 V, which is half a speed V at which the movement block 2 moves relative to the raceway rail 1. The ball deflection groove 33 is gradually deepened as described above, and hence the balls 3 rolling through the load straight-line groove 31 are gradually released from the load upon reaching the ball deflection groove 33. The balls 3 released from the load advance as they are through the rolling groove 10 of the raceway rail 1 while being pushed by the succeeding balls 3. In this context, the ball deflection groove 33 interrupts the rolling of the balls 3 in the rolling groove 10 and forcibly changes the advancing direction of the balls 3, and hence the balls 3 are moved to the concave curve 10a of the rolling groove 10 by the ball deflection groove 33, and climb up the concave curve 10a so as to be raised to the side surface of the raceway rail 1. With this structure, the balls 3 completely leave the rolling groove 10 of the raceway rail 1, and are completely accommodated in the ball deflection groove 33 of the movement block 2.

As illustrated in FIG. 6, the ball deflection groove 33 developed in a plan view has a substantially U-shaped raceway, and hence the balls 3 accommodated in the ball deflection groove 33 are reversed in the rolling direction so as to enter the non-load straight-line groove 32 of the movement block 2, which is faced with the upper surface of the raceway rail 1. Further, the balls 3 having advanced in the non-load straight-line groove 32 enter the ball deflection groove 33 on the opposite side so as to be reversed in their rolling direction again, and then enter between the rolling groove 10 of the raceway rail 1 and the load straight-line groove 31 of the movement block 2. In this process, the balls 3 enter between the raceway rail 1 and the movement block 2 while climbing down sidewise the concave curve 10a of the rolling groove 10, and changed from the non-load state to the load state as the ball deflection groove 33 becomes gradually shallower.

In this way, the balls 3 circulate through the track groove 30 of the movement block 2, and in accordance therewith, the movement block 2 can move incessantly and continuously along the raceway rail 1.

Figure 7:
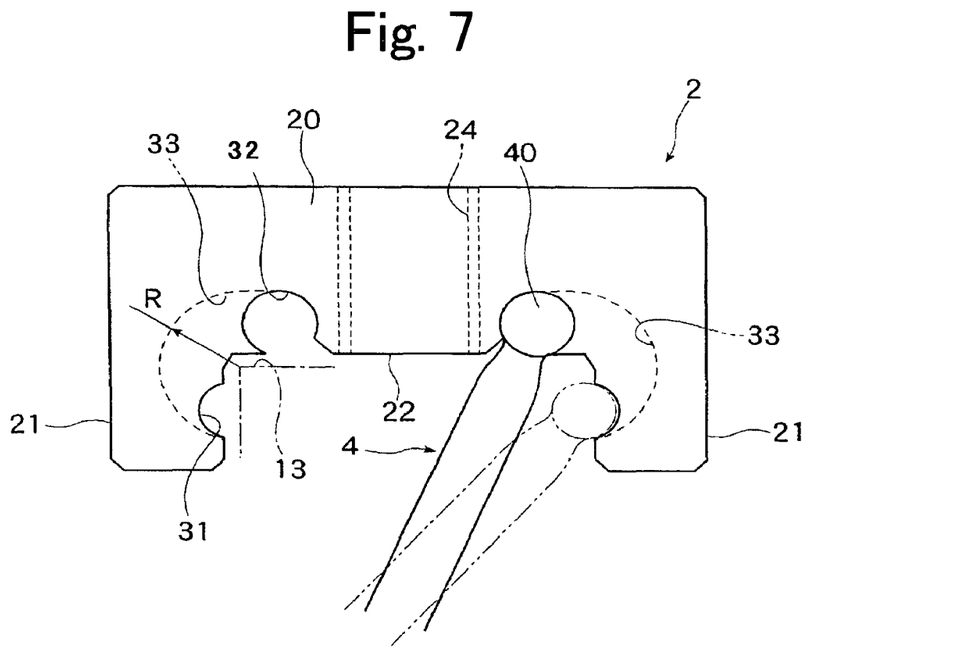
FIG. 7 illustrates a state of processing the track groove in the movement block.

The load straight-line groove 31 and the non-load straight-line groove 32 of the track groove 30 sandwich the concave corner portion of the guide groove 22 of the movement block 2, and the balls 3 rolling in the ball deflection groove 33 move between the load straight-line groove 31 and the non-load straight-line groove 32 while surrounding the periphery of the upper corner portion 13 of the raceway rail 1, which is faced with the concave corner portion. When the track groove 30 is entirely developed in a plan view, as illustrated in FIG. 6, the ball deflection groove 33 is formed in a substantially U-shaped configuration. Meanwhile, when the ball deflection groove 33 is observed in the cross section orthogonal to the longitudinal direction of the raceway rail 1, as illustrated in FIG. 7, the ball deflection groove 33 is formed in a single arc which has a predetermined radius R around the upper corner portion 13 of the raceway rail 1. That is, the ball deflection groove 33 forms a trace which is obtained by the combination of the configurations illustrated in FIGS. 6 and 7. As described above, when the trace of the ball deflection groove 33 in the cross section orthogonal to the longitudinal direction of the raceway rail 1 is formed in a single arc around the upper corner portion 13 of the raceway rail 1, the behavior of the balls 3 is stabilized which move between the load straight-line groove 31 and the non-load straight-line groove 32 while surrounding the periphery of the upper corner portion 13 of the raceway rail 1. As a result, it is possible to smooth the rolling of the balls 3 in the ball deflection groove 33.

Further, as described above, the upper corner portion 13 of the raceway rail 1 is formed in a convex curve shape continuous from the concave curve 10a of the rolling groove 10 to the upper surface 11. Also in this regard, the behavior of the balls 3 is stabilized which have left the load straight-line groove 31 toward the non-load straight-line groove 32 while surrounding the upper corner portion 13 of the raceway rail 1. As a result, it is possible to smooth the rolling of the balls 3 in the ball deflection groove 33.

Next, the manufacturing method for the movement block 2 is described.

The movement block 2 is manufactured as follows: bar steel is first subjected to a drawing processing so as to be formed in a channel configuration; the base portion 20 is subjected to a processing for forming the tap hole 24 therein; and finally the track groove 30 is formed through cutting with use of a ball-end mill. Further, prior to cutting of the track groove 30, the bar steel formed in a channel configuration is subjected to quenching. Note that, the method of forming the bar steel in a channel configuration can be appropriately selected in accordance with the material of the movement block 2. For example, forging can be adopted therefor.

As illustrated in FIG. 7, cutting of the track groove 30 is performed by inserting a ball-end mill 4 to the guide groove 22 of the movement block 2. The leading end of the ball-end mill 4 is provided with a ball head 40 which is conformed to the curvature of the concave curves 10a and 10b of the rolling groove 10, the ball head 40 having a diameter slightly larger than the diameter of the balls 3. In the case of cutting the load straight-line groove 31, the ball-end mill 4 forms one concave curve 10a, and then forms the other concave curve 10b while being slightly offset along the inner surface of the flange portion 21. Further, the ball deflection groove and the non-load straight-line groove can be formed through cutting in a single process successively to the formation of the load straight-line groove.

For example, it is possible to form the track groove 30 in a single process owing to the interlocking of a work main shaft and a mill main shaft of a compound lathe, to which the movement block 2 formed in a channel configuration and the ball-end mill 4 are respectively fixed. When the load straight-line groove 31 and the non-load straight-line groove 32 are formed, the mill main shaft is moved in the longitudinal direction of the movement block 2. When the ball deflection groove 33 is formed, cutting is performed while the work main shaft is rotated at a predetermined angle in accordance with the movement of the mill main shaft. Note that, in the illustration in FIG. 7, the ball-end mill 4 fixed to the mill main shaft is turned by a predetermined angle so as to form the ball deflection groove 33. However, actually, the mill main shaft is not turned, but the work main shaft to which the movement block 2 is fixed is rotated by a predetermined angle, whereby the ball deflection groove 33 is formed. Further, it is possible to form the track groove with use of a machining center instead of the compound lathe.

When the track groove 30 is entirely formed only in the inner surface of the flange portion 21 while a part of the track groove 30 is not formed in the base portion 20 of the movement block 2, the insertion angle of the ball-end mill 4 with respect to the guide groove 22 of the movement block 2 is limited when the movement block 2 is to be downsized, and hence it may be difficult to form the track groove 30 with precision. However, as in the first embodiment, when the track grooves 30 are formed while straddling the concave corner portions of the guide groove 22 of the movement block 2, the approach of the ball-end mill 4 with respect to the portion in which the track groove 30 is formed is facilitated, and the movement block 2 can be subjected to the processing for forming the track groove 30 with high precision therein.

Further, the track groove 30s of the movement block 2 exist while straddling the concave corners of the guide groove 22 of the movement block 2. Therefore, the protruding height of the flange portion 21 with respect to the base portion 20 can be set small. As a result, it is also possible to set the height of the raceway rail 1 straddled by the movement block 2 to be small. With this structure, it is possible to suppress the height of center of gravity of the movement block 2 reciprocating along the raceway rail 1. Therefore, occurrence of pitching is suppressed during running of the movement block 2, thereby achieving a linear reciprocating movement of high precision, which involves a small speed ripple.

In addition, when the productivity of the movement block 2 is focused, the movement block 2 is completed solely by forming the track groove 30 in the bar steel formed in a channel configuration. Thus, when the lengths of the load straight-line groove 31 and the non-load straight-line groove 32 in the track groove 30 are arbitrarily changed, it is possible to manufacture with ease the movement block 2 which has different load capacities with respect to the same raceway rail 1. That is, the movement block 2 is completed as follows: the bar steel is processed in a channel configuration so as to be conformed to the raceway rail 1 having a predetermined width, then the bar steel is mounted to the above-mentioned compound lathe and processed for forming therein the track groove 30 of an arbitrary size, and after that the bar steel is cut in accordance with the size of the track groove 30. Accordingly, a linear guidance device in which the movement block 2 and the raceway rail 1 are combined can be rapidly produced even in the case of the production by order. As a result, the cost incurred by inventory management can be saved, whereby the linear guidance device can be provided at lower price.

Figure 8:
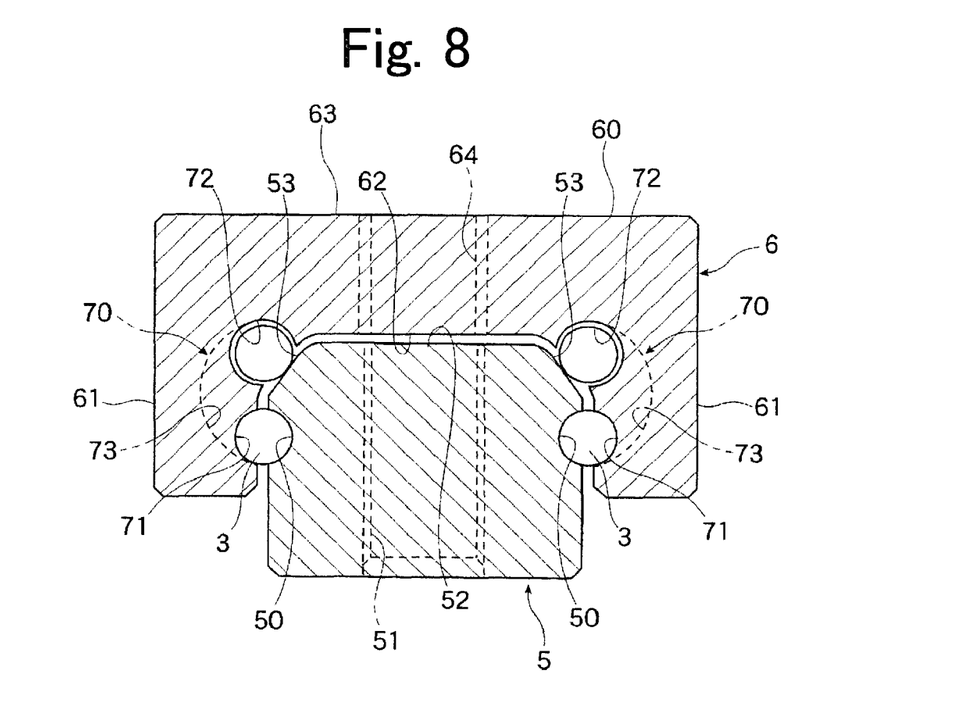
FIG. 8 is a front sectional view of a linear guidance device according to a second embodiment of the present invention.

Next, FIG. 8 illustrates a linear guidance device according to a second embodiment of the present invention.

The linear guidance device according to the second embodiment also includes an elongated raceway rail 5 formed in a substantially rectangular sectional configuration, and a movement block 6 formed in a channel configuration and assembled to the raceway rail 5 through an intermediation of the large number of balls 3, the movement block 6 being allowed to freely reciprocate on the raceway rail 5.

The raceway rail 5 is provided with a rolling groove 50 for the balls 3, which is formed in the longitudinal direction on each side surface thereof. Each of those rolling grooves 50 is formed in a so-called Gothic arch sectional configuration, which is the same as the first embodiment described above. Further, the raceway rail 5 is provided with multiple bolt receiving holes 51 which is formed at predetermined intervals in the longitudinal direction thereof while passing therethrough.

Further, the upper corner portion which is bordered with an upper surface 52 and each of the side surfaces of the raceway rail 5 is obliquely notched so that a non-load ball support surface described later is formed. Accordingly, the upper portion of the raceway rail 5 is formed in a substantially trapezoidal shape above the portion in which the ball rolling groove 50 is formed.

Meanwhile, the movement block 6 includes a base portion and a pair of flange portions 61 and 61 orthogonal to the base portion 60 so as to be formed in a channel configuration, and a guide groove 62 is provided between the pair of flange portions 61, to which the top of the raceway rail 5 is loosely fitted. Further, the top surface of the base portion 60 serves as an attachment surface for a movable body such as a table, and a tap hole 64 into which a fixing screw is screwed is formed in the base portion 60.

The movement block 6 includes track grooves 70 through which the balls 3 make an endless circulation. As in the first embodiment described above, each of the track grooves 70 includes a load straight-line groove 71 formed in the inner surface of each of the flange portions 61 while being faced with each of the rolling grooves 50 of the raceway rail 5, a non-load straight-line groove 72 formed in parallel with the load straight-line groove 71, and a ball deflection groove 73 for circulating the balls 3 between the load straight-line groove 71 and the non-load straight-line groove 72. The track grooves 70 are entirely opened to the raceway rail 5, and the balls 3 arranged in the track grooves 70 circulate in the track grooves 70 while being faced with the raceway rail 5.

Note that, in the second embodiment, the non-load straight-line groove 72 is formed in the concave corner portion of the guide groove 62, which is bordered with the base portion 60 and the flange portion 61 of the movement block 6. Further, the non-load straight-line groove 72 is not faced with the upper surface 52 of the raceway rail 5, but faced with the non-load ball support surface 53 formed in the upper corner portion of the raceway rail 5.

The track groove 70 according to the second embodiment can be formed also through cutting of the movement block 6 with use of a ball-end mill, that is, the load straight-line groove 71, the ball deflection groove 73, and the non-load straight-line groove 72 can be successively formed in a single process through cutting. Further, the non-load straight-line groove is formed not in the inner surface of the flange portion of the movement block, but in the concave corner portion of the guide groove 62 of the movement block 6. Therefore, the approach of the ball-end mill with respect to the portion in which the track groove 70 is formed is facilitated, and the movement block 6 can be processed with high precision for forming the track groove 70 therein.

In particular, when compared with the case of the first embodiment, the non-load straight-line groove is formed in the concave corner portion of the guide groove 62 in the second embodiment. Thus, the length of the ball deflection groove which communicatively couples the load straight-line groove and the non-load straight-line groove can be reduced. As described above, it is possible to reduce the processing time in the case of forming the track groove through cutting, to thereby improve the productivity of the movement block 6.

Further, the non-load straight-line groove 72 is faced with the non-load ball support surface 53 which is formed by obliquely notching the upper corner portion of the raceway rail 5. Therefore, when compared with that in the case of the first embodiment in which the balls 3 circulate between the load straight-line groove 31 and the non-load straight-line groove 32 while surrounding the upper corner portion of the raceway rail 1 of the balls 3, the movement of the balls 3 between the load straight-line groove 71 and the non-load straight-line groove 72, that is, the rolling of the balls in the ball deflection groove 73 can be smoothed.

The invention claimed is:

1. A linear guidance device, comprising:
    a raceway rail (1, 5) which is formed in a substantially rectangular sectional configuration and provided with a ball rolling groove (10, 50) formed in a longitudinal direction on each side surface thereof; and
    a movement block (2, 6) which is
        formed in a channel configuration in which a base portion (20, 60) and a pair of flange portions (21, 61) protruding on the base portion are provided so that a guide groove (22, 62) is formed, and
        assembled with respect to the raceway rail (1, 5) loosely fitted to the guide groove (22, 62) through an intermediation of a large number of balls (3), and
    comprising multiple track grooves (30, 70) through which the balls (3) circulate and which are provided with the guide groove (22, 62) faced with the raceway rail (1, 5), wherein each of the track grooves (30, 70) comprises:
    a load straight-line groove (31, 71) which is formed in an inner surface of the flange portions (21, 61) while being faced with the ball rolling groove (10, 50) of the raceway rail (1, 5);
    a non-load straight-line groove (32, 72) which is provided in parallel with the load straight-line groove (31, 71) and formed in a concave corner portion of the guide groove (22, 62), which is bordered with the flange portions (21, 61) and the base portion (20, 60) or formed in the base portion (20, 60) so as to be faced with the raceway rail (1, 5);
    a ball deflection groove (33, 73) which communicatively couples the load straight-line groove (31, 71) and the non-load straight-line groove (32, 72) to each other so as to allow the balls (3) to move therebetween.

2. The linear guidance device according to claim 1, wherein:
    the movement block (2, 6) is formed of a quenched steel; and
    the track grooves (30, 70) are formed through cutting.

3. The linear guidance device according to claim 1, wherein, when the non-load straight-line groove (32, 72) is provided in the base portion (20, 60) of the movement block (2, 6), a trace of the ball deflection groove (33, 73) formed in vertical cross section in a longitudinal direction of the raceway rail (1, 5) is formed as a single arc around a corner portion of the raceway rail (1, 5) which is faced with the concave corner portion of the guide groove (22, 62) of the movement block (2, 6).

4. The linear guidance device according to claim 3, wherein the corner portion of the raceway rail (1, 5), which is faced with the concave corner portion of the guide groove (22, 62) of the movement block (2, 6), is formed in a curved configuration.

5. The linear guidance device according to claim 1, wherein, while the non-load straight-line groove (32, 72) is provided in the concave corner portion of the guide groove (22, 62), which is bordered with the flange portions (21, 61) and the base portion (20, 60), the raceway rail (1, 5) is provided with a non-load ball support surface (53) which is formed between the side surface provided with the ball rolling groove (10, 50) and an upper surface (11) faced with the base portion (20, 60) and which is faced with the non-load straight-line groove (32, 72).

* * * * *